US009940409B2

(12) United States Patent
Shelkey et al.

(10) Patent No.: US 9,940,409 B2
(45) Date of Patent: *Apr. 10, 2018

(54) CONTEXTUAL SEARCH TOOL

(71) Applicant: BANK OF AMERICA CORPORATION, Charlotte, NC (US)

(72) Inventors: Brent Alan Shelkey, Huntersville, NC (US); Alicia C. Jones-McFadden, Fort Mill, SC (US); Craig Sobol, Waxhaw, NC (US); Carrie Anne Hanson, Charlotte, NC (US); Ivory Assan, Columbia, SC (US); Shira Bauman, Baltimore, MD (US); Matthew Hsieh, Upper Darby, PA (US); Shuangshuang Li, Pittsburgh, PA (US); Gabriela Moreno Cesar, The Woodlands, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 559 days.

This patent is subject to a terminal disclaimer.

(21) Appl. No.: 14/529,456

(22) Filed: Oct. 31, 2014

(65) Prior Publication Data

US 2016/0125043 A1    May 5, 2016

(51) Int. Cl.
G06F 17/30    (2006.01)
G06Q 30/00    (2012.01)

(52) U.S. Cl.
CPC .. *G06F 17/30967* (2013.01); *G06F 17/30979* (2013.01); *G06F 17/30991* (2013.01); *G06Q 30/00* (2013.01)

(58) Field of Classification Search
CPC ......... G06F 17/30967; G06F 17/30979; G06F 17/30991; G06Q 30/00
USPC ....................................................... 707/722
See application file for complete search history.

(56) References Cited

U.S. PATENT DOCUMENTS

| 5,724,567 | A | * | 3/1998 | Rose | G06F 17/30699 707/999.002 |
| 5,918,236 | A | * | 6/1999 | Wical | G06F 17/274 707/999.005 |
| 5,953,732 | A | * | 9/1999 | Meske, Jr. | H04L 67/30 707/999.002 |
| 5,978,799 | A | | 11/1999 | Hirsch | |

(Continued)

*Primary Examiner* — Kris E Mackes
*Assistant Examiner* — Thuy T Bui
(74) *Attorney, Agent, or Firm* — Michael A. Springs; Moore & Van Allen PLLC; Jeffrey R. Gray

(57) ABSTRACT

This invention provides a contextual search tool to a user. The contextual search tool receives a search from the user and provides search results, content, and dynamic contextual information (e.g., dynamic contextual questions, user information, and account information) to the user. The contextual search tool then receives contextual information input from the user (input for the dynamic contextual information, selection of the search results, or the like) and updates the search results and the dynamic contextual information. As such, the invention of the present invention improves the ability of the contextual search tool to provide tailored, customized, and relevant search results to the user based not only on the search terms provided by the user, but based on dynamic contextual information that changes as the user takes actions within the contextual search interface.

15 Claims, 8 Drawing Sheets

(56) References Cited

U.S. PATENT DOCUMENTS

| | | |
|---|---|---|
| 6,177,932 B1 | 1/2001 | Galdes et al. |
| 6,510,431 B1 | 1/2003 | Eichstaedt et al. |
| 6,678,685 B2 | 1/2004 | McGill et al. |
| 7,080,071 B2 | 7/2006 | Henrion et al. |
| 7,103,556 B2 | 9/2006 | Del Rey et al. |
| 7,269,590 B2 * | 9/2007 | Hull .................. G06Q 10/10 707/770 |
| 7,299,222 B1 | 11/2007 | Hogan et al. |
| 7,315,837 B2 | 1/2008 | Sloan et al. |
| 7,409,364 B1 | 8/2008 | Barton et al. |
| 7,565,630 B1 | 7/2009 | Kamvar et al. |
| 7,566,630 B2 | 7/2009 | Vo |
| 7,613,992 B1 | 11/2009 | Raichur et al. |
| 7,890,405 B1 | 2/2011 | Robb |
| 8,037,147 B1 | 10/2011 | Herold et al. |
| 8,065,230 B1 | 11/2011 | Little |
| 8,078,607 B2 | 12/2011 | Oztekin et al. |
| 8,082,242 B1 | 12/2011 | Mysen et al. |
| 8,086,508 B2 | 12/2011 | Dheer et al. |
| 8,271,509 B2 | 9/2012 | Dauginas et al. |
| 8,290,866 B1 | 10/2012 | Little |
| 8,374,944 B2 | 2/2013 | Robb |
| 8,504,554 B2 | 8/2013 | Raichur et al. |
| 8,417,608 B2 | 9/2013 | Benefield et al. |
| 8,719,292 B2 | 5/2014 | Nussel et al. |
| 9,141,617 B1 | 9/2015 | Gargi et al. |
| 2003/0220915 A1 | 11/2003 | Fagan et al. |
| 2003/0220917 A1 * | 11/2003 | Copperman ........ G06F 17/3064 707/999.003 |
| 2005/0071741 A1 * | 3/2005 | Acharya .......... G06F 17/30864 715/208 |
| 2005/0108406 A1 * | 5/2005 | Lee .................. G06F 17/30867 707/E17.109 |
| 2006/0026147 A1 * | 2/2006 | Cone ................ G06F 17/30867 |
| 2006/0106788 A1 | 5/2006 | Forrest |
| 2007/0192166 A1 * | 8/2007 | Van Luchene .... G06F 17/30646 707/E17.063 |
| 2008/0147788 A1 | 6/2008 | Omoigui |
| 2008/0319952 A1 * | 12/2008 | Carpenter .......... G06F 17/3064 707/999.003 |
| 2009/0012887 A1 * | 1/2009 | Taub ..................... G06Q 10/00 705/34 |
| 2009/0199242 A1 * | 8/2009 | Johnson ............ G06F 17/30781 725/46 |
| 2009/0287683 A1 | 11/2009 | Bennett |
| 2010/0250578 A1 | 9/2010 | Athsani et al. |
| 2010/0287242 A1 | 11/2010 | Kumar |
| 2010/0312724 A1 | 12/2010 | Pinckney et al. |
| 2011/0055207 A1 | 3/2011 | Schorzman et al. |
| 2011/0125623 A1 | 5/2011 | DeLillio |
| 2011/0145234 A1 | 6/2011 | Hu |
| 2011/0252011 A1 * | 10/2011 | Morris ................. H04L 12/185 707/706 |
| 2012/0054645 A1 | 3/2012 | Hoomani et al. |
| 2012/0054646 A1 | 3/2012 | Hoomani et al. |
| 2012/0089500 A1 | 4/2012 | Dheer et al. |
| 2012/0179573 A1 | 7/2012 | Falcone et al. |
| 2012/0265615 A1 * | 10/2012 | Munisamy ......... G06Q 30/0281 705/14.58 |
| 2013/0031081 A1 | 1/2013 | Vijayaraghavan et al. |
| 2013/0097061 A1 | 4/2013 | Saich et al. |
| 2013/0103580 A1 | 4/2013 | Ventura |
| 2013/0151227 A1 | 6/2013 | Yang et al. |
| 2013/0151527 A1 | 6/2013 | Bruich et al. |
| 2013/0167044 A1 | 6/2013 | Graves et al. |
| 2013/0282749 A1 | 10/2013 | Batraski et al. |
| 2014/0019462 A1 | 1/2014 | Heck et al. |
| 2014/0101014 A1 | 4/2014 | Iimuro et al. |
| 2014/0129442 A1 | 5/2014 | Hanson et al. |
| 2014/0143141 A1 | 5/2014 | Kumar |
| 2014/0195621 A1 | 7/2014 | Rao Dv |
| 2014/0207882 A1 | 7/2014 | Joo et al. |

* cited by examiner

CONTEXTUAL SEARCH TOOL

FIELD

This invention relates generally to the field of content searching, and more particularly, to improvements to tailoring the results of the content searching to the user.

BACKGROUND

Content search results are limited to the text inputted by a user searching for the content. It is difficult to provide more tailored search results for the user.

BRIEF SUMMARY

Embodiments of the present invention address the above needs and/or achieve other advantages by providing apparatuses (e.g., a system, computer program product, and/or other device) and methods that help improve the search results (e.g., the content within the search results) for the users (e.g., customers, clients, potential customers, potential clients, or the like).

In some embodiments the invention the contextual search includes first receiving a search from a user related to a topic(s) in which the user is interested. The search may include search terms, keywords, phrases, filter selections, or the like. In response to the search the present invention determines search results for the user based at least in part on the search received from the user. In other embodiments, the search results may also be determined based on user profile information or user account information. In addition to determining the search results, the contextual search also includes determining dynamic contextual information to present to the user to tailor the search results to the user. The dynamic contextual information may include contextual search questions, user profile questions, user account information, and/or other like information. The dynamic contextual information may be based on the search terms received from the user, the user's current user profile at the time of the search, the user's current account information at the time of the search, or the like. The search results and/or the dynamic contextual information is displayed to the user in a contextual search interface, which may include separate sections for the search results, content information, and dynamic contextual information.

The contextual search tool receives selections from the user regarding the dynamic contextual information, such as but not limited to answers to contextual questions, information for the user's profile, user account information to utilize in the search, information related to the content selections made by the user, and/or input provided by an advisor. As will be discussed in further detail later the system of the present invention receives the various types of information, and updates the search results and the dynamic contextual information and presents the updated search results, updated content, and updated dynamic contextual information to the user.

As such, the invention of the present invention improves the ability of the search tool to provide tailored, customized, and relevant search results to the user based not only on the search terms provided by the user, but based on dynamic contextual information that changes when the user takes actions within the contextual search interface. The search of the present invention is an improvement over traditional search methods because it actively updates the search results as the contextual search identifies the specific information in which the user is interested. The present invention reduces the amount of time it takes for a user to identify the relevant content in which the user may be interested because it allows the user to tailor the search, or filter the search results, based on specific information provided by the user for which only the user or the company (e.g. financial institution) associated with the contextual search may have access. In traditional searching, the user may not know exactly what to search for, and the search algorithm may not know how to take the user search terms and find the best results for the user because it may not have all of the necessary information to provide the tailored search results. As such, the present invention bridges the gap between the user's knowledge and the search algorithm's ability to identify information by providing technical solutions that augment or enhance the initial search results for the user based on additional contextual information that is presented to the user, which the user can select as being important or not important to the user's search results. For at least these reasons, the present invention related to the contextual search tool is significantly more than the traditional searching tools.

Moreover, the system (e.g., processor, or the like) of the present invention allows for the dynamic interface of the contextual search tool to change and provide the tailored search results as the user enters search terms, selects or deselects the dynamic contextual information to include or exclude from the search, selects particular search results, and views content within the contextual search interface. The dynamic nature of the interface cannot be performed by a human with pen and paper because among other reasons, the human would not be able to present the dynamic interface that changes in real-time or near real-time as the user takes the different actions described herein with respect to the search, including selecting the dynamic contextual information.

In addition, the present invention provides tangible search results using the dynamic interface that otherwise could not be achieved without the present invention. The tangible search results are determined and presented based on the dynamic contextual information, and other user selections, which change as the user makes various selections. The tangible search results are provided and displayed to the user in the content section of the dynamic contextual interface.

Embodiments of the invention may comprise systems, computer program product, and methods for providing a contextual search tool that improves search results presented to a user. One embodiment of the invention comprises receiving a search from the user; determining the search results to display in a contextual search interface; displaying the search results in a search results section of the contextual search interface, wherein the search results comprise a list of the search results; displaying content in a content section of the contextual search interface, wherein the content is for at least one of the search results from the search results section, and wherein the content section and the search results section are different sections; determining dynamic contextual information based on the search from the user, wherein the dynamic contextual information comprises at least one dynamic contextual question; displaying the dynamic contextual information in a dynamic contextual information section of the contextual search interface, wherein the dynamic contextual information section is different from the search results section and the content section; receiving contextual information input from the user, wherein the contextual information input comprises at least an answer to the dynamic contextual question; determining updated search results, updated content, and updated dynamic contextual information based on the contextual information input from the user, wherein the updated dynamic contextual information comprises at least one updated dynamic contextual question; and displaying the updated search results in the search results section, the updated content in the content section, and the updated dynamic contextual information in the dynamic contextual information section.

In further accord with an embodiment of the invention, the dynamic contextual information and the updated dynamic contextual information change based on the search from the user, the dynamic contextual input from the user, the search results selected by the user, and time the user spends on viewing the content in the content section.

In another embodiment, the invention further comprises receiving user profile information; and wherein determining the search results or the updated search results are based in part on the user profile information.

In still another embodiment, the invention further comprises receiving user account information; and wherein determining the search results or the updated search results are based in part on the user account information.

In yet another embodiment, the invention further comprises providing a request to the user to save the contextual information input to the user profile; and receiving a request from the user to save the contextual information input to the user profile, wherein the contextual information input is utilized in the future for determining the updated search results or other search results.

In further accord with an embodiment, the invention further comprises determining at least one of the search results selected by the user; and determining the updated search results and the updated dynamic contextual information based on the at least one of the search results selected by the user.

In another embodiment, the invention further comprises determining an amount of time the user views the content for the at least one of the search results; and determining the updated search results and the updated dynamic contextual information based on the amount of time the user views the content for the at least one of the search results.

In still another embodiment, the invention further comprises determining a user profile strength of the user based on saved user profile information and the dynamic contextual information input provided by the user; and displaying the profile strength in a profile strength section.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
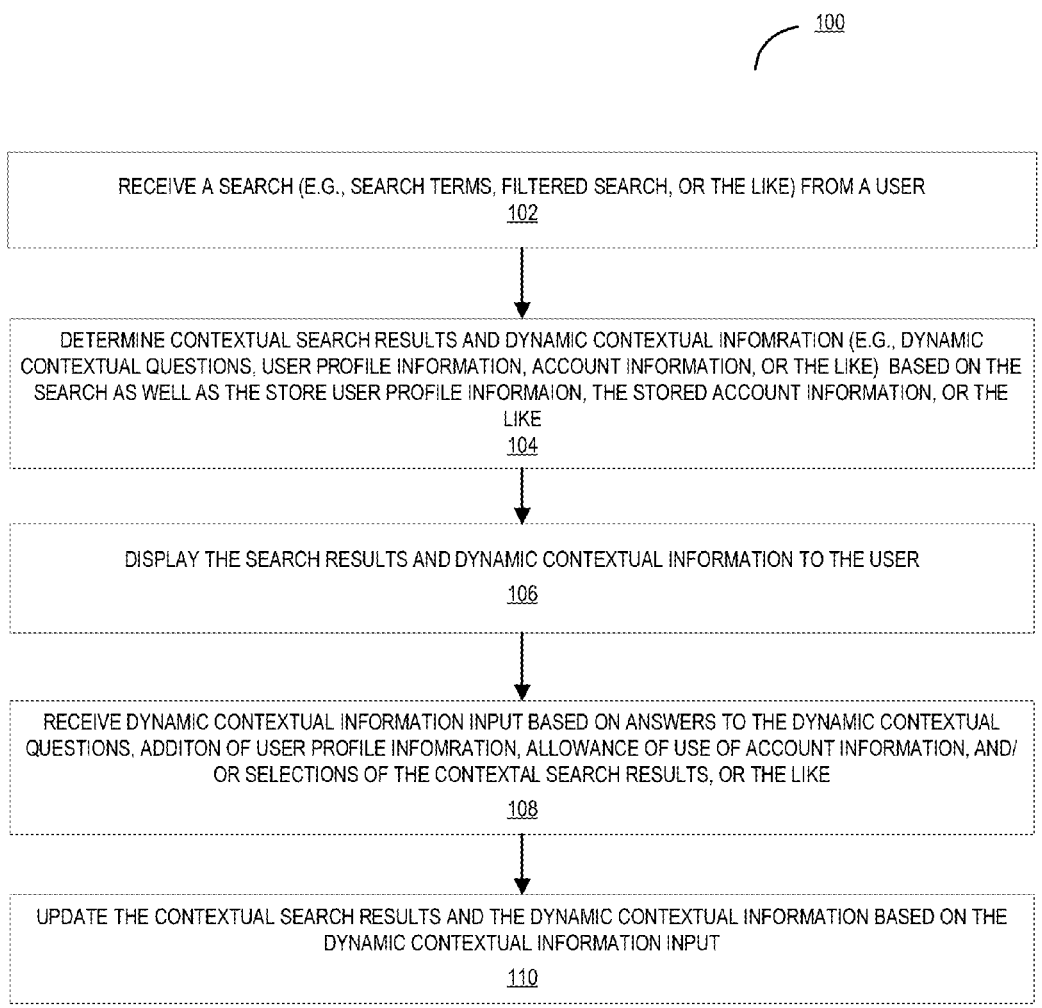
Figure 2:
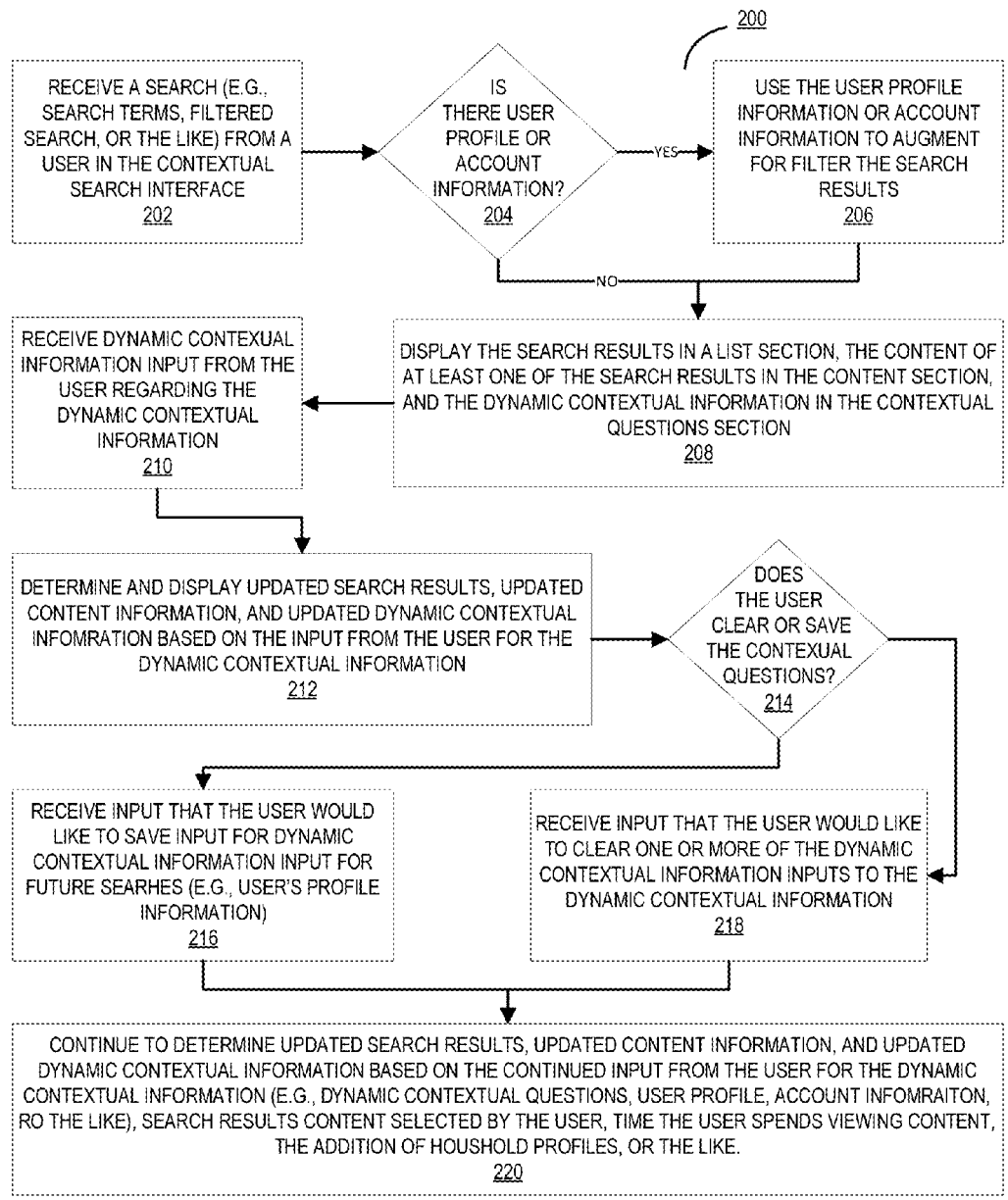
Figure 3:
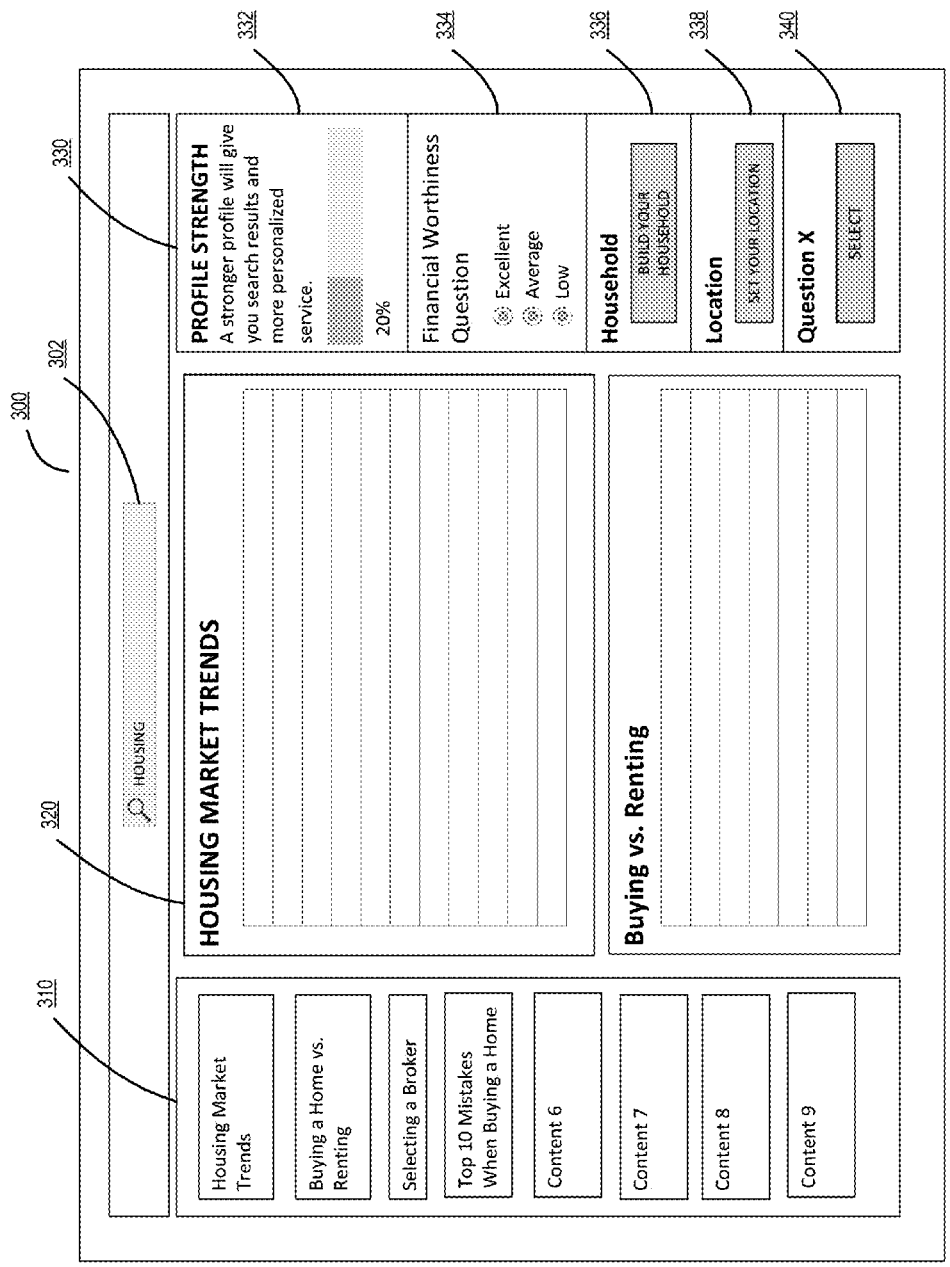
Figure 4:
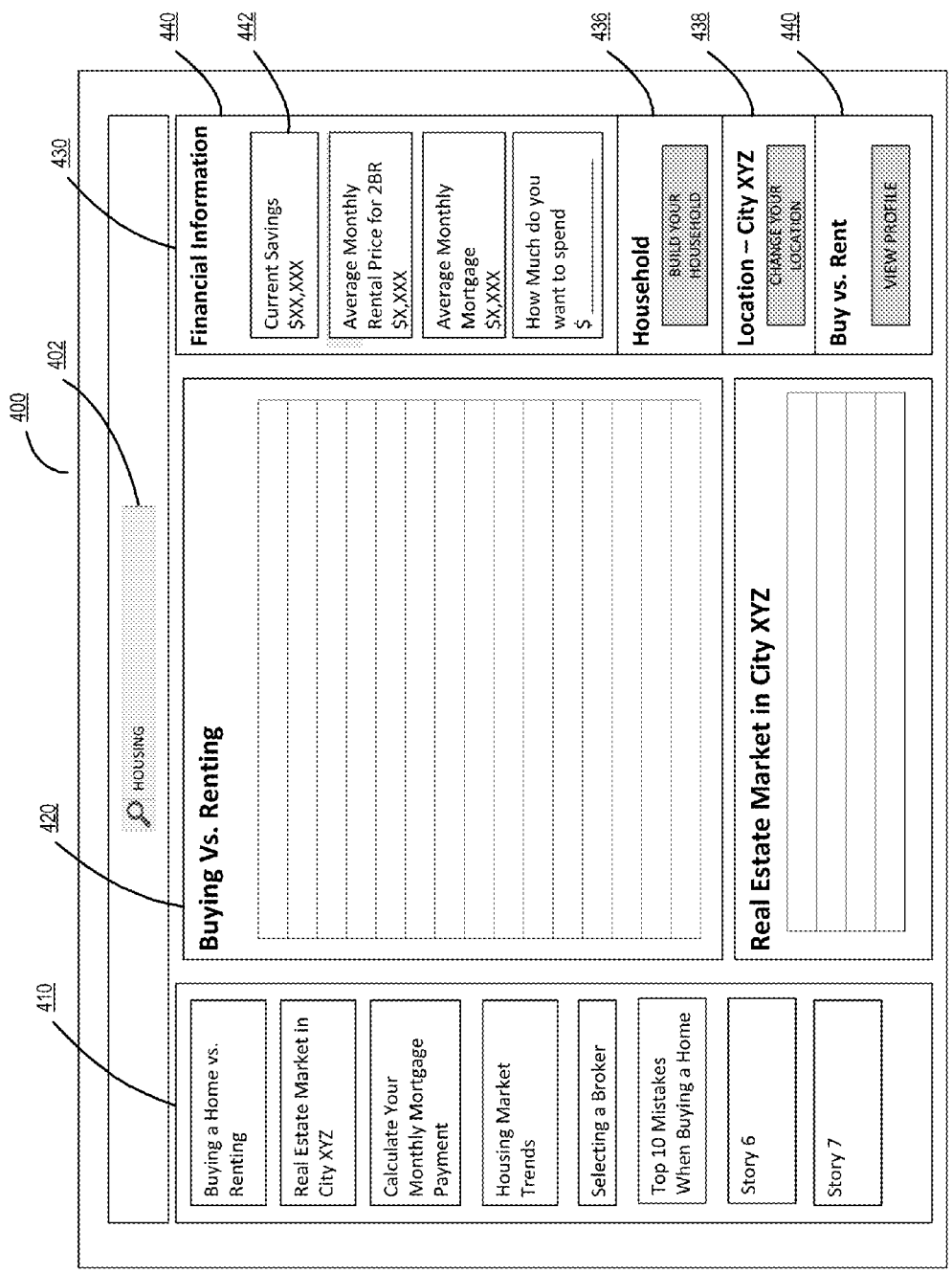
Figure 5:
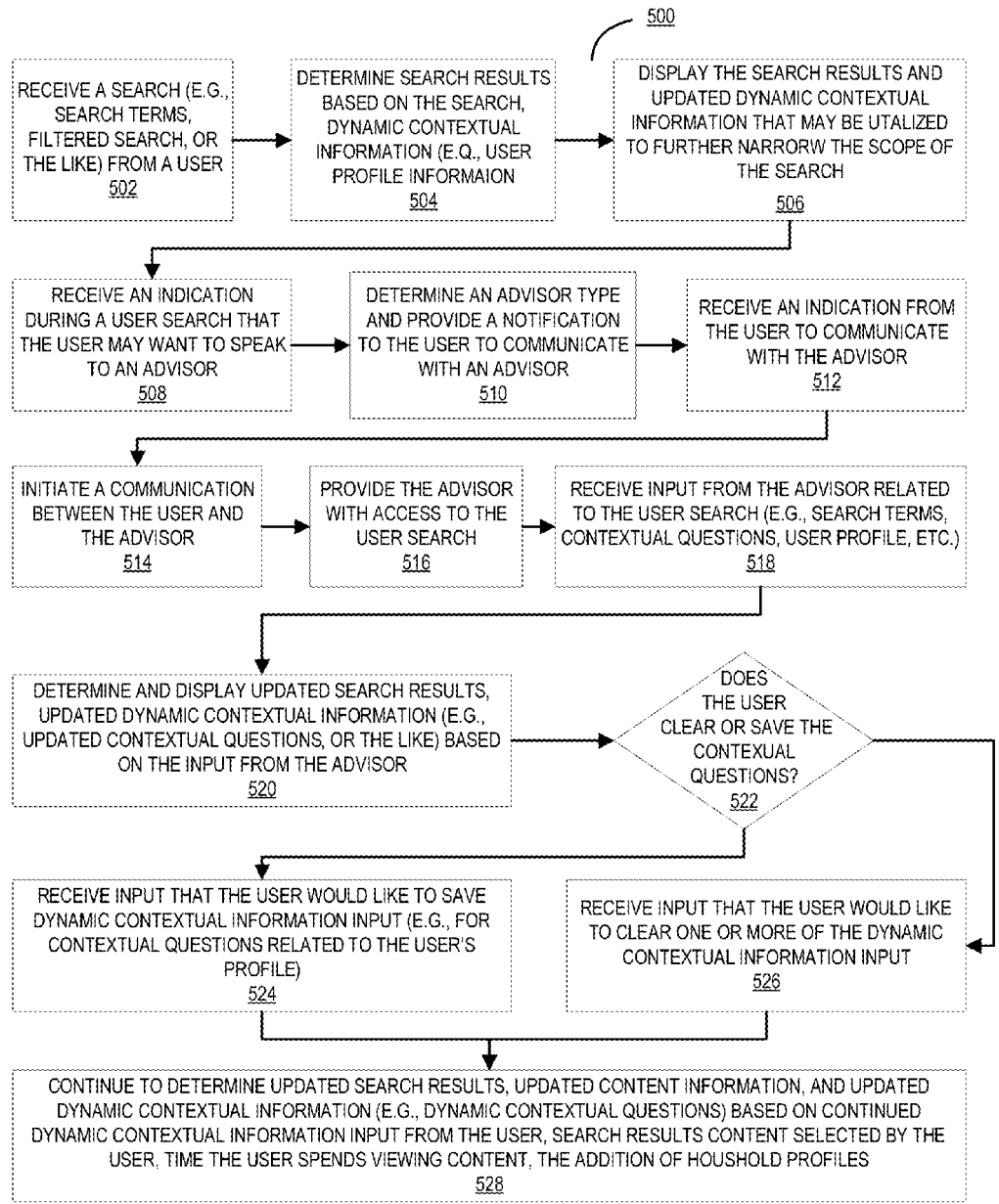
Figure 6:
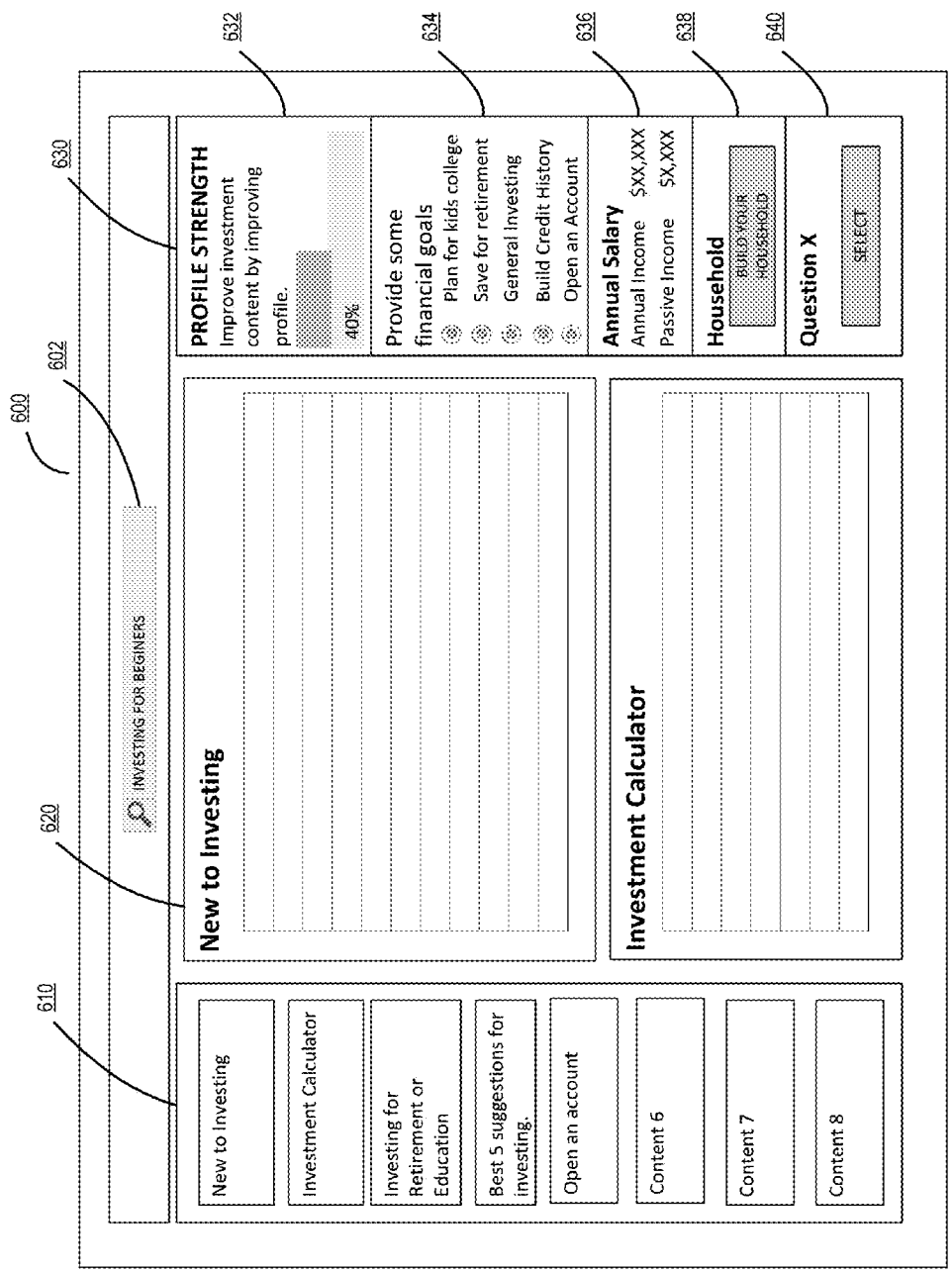
Figure 7:
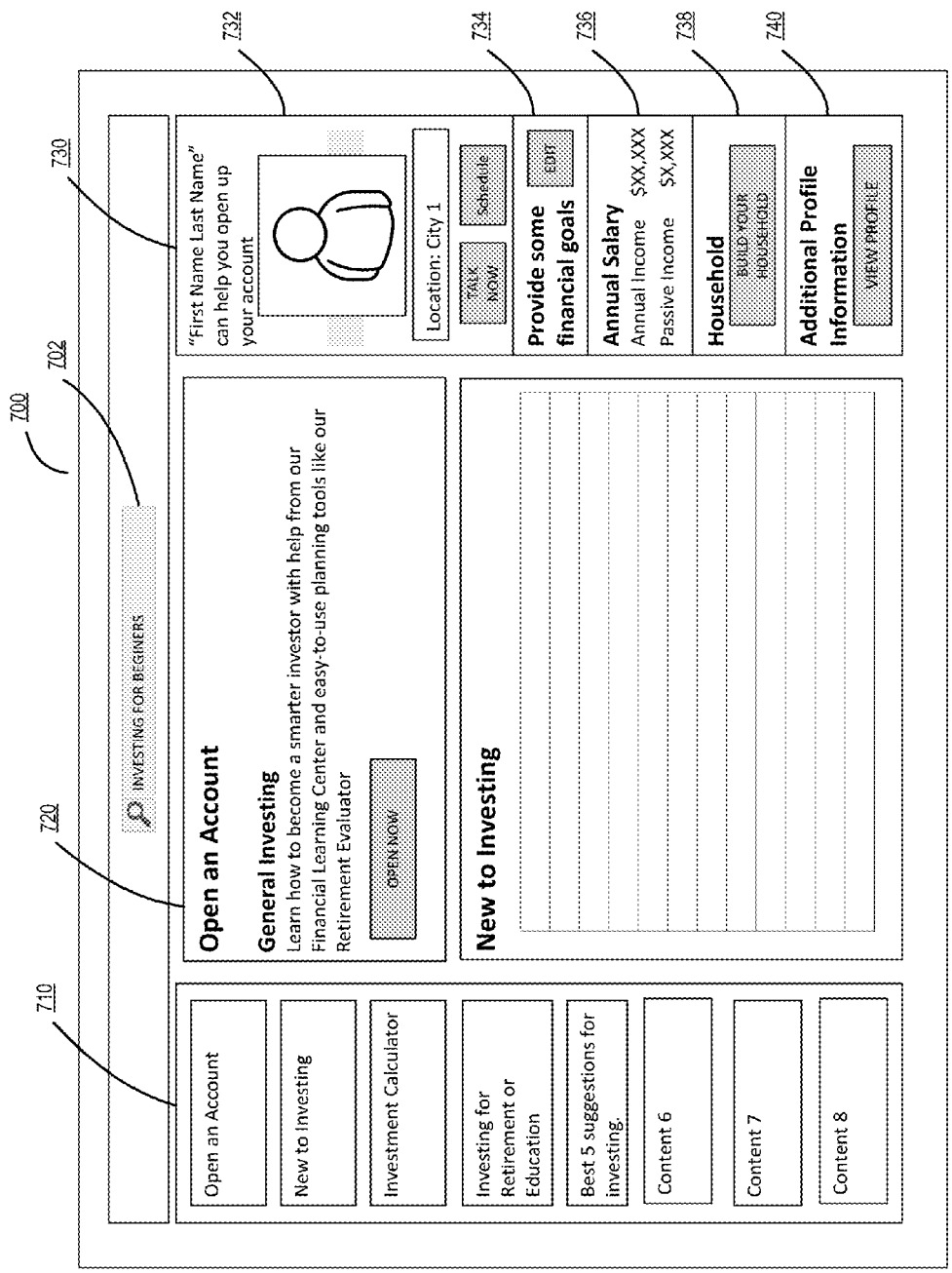
Figure 8:
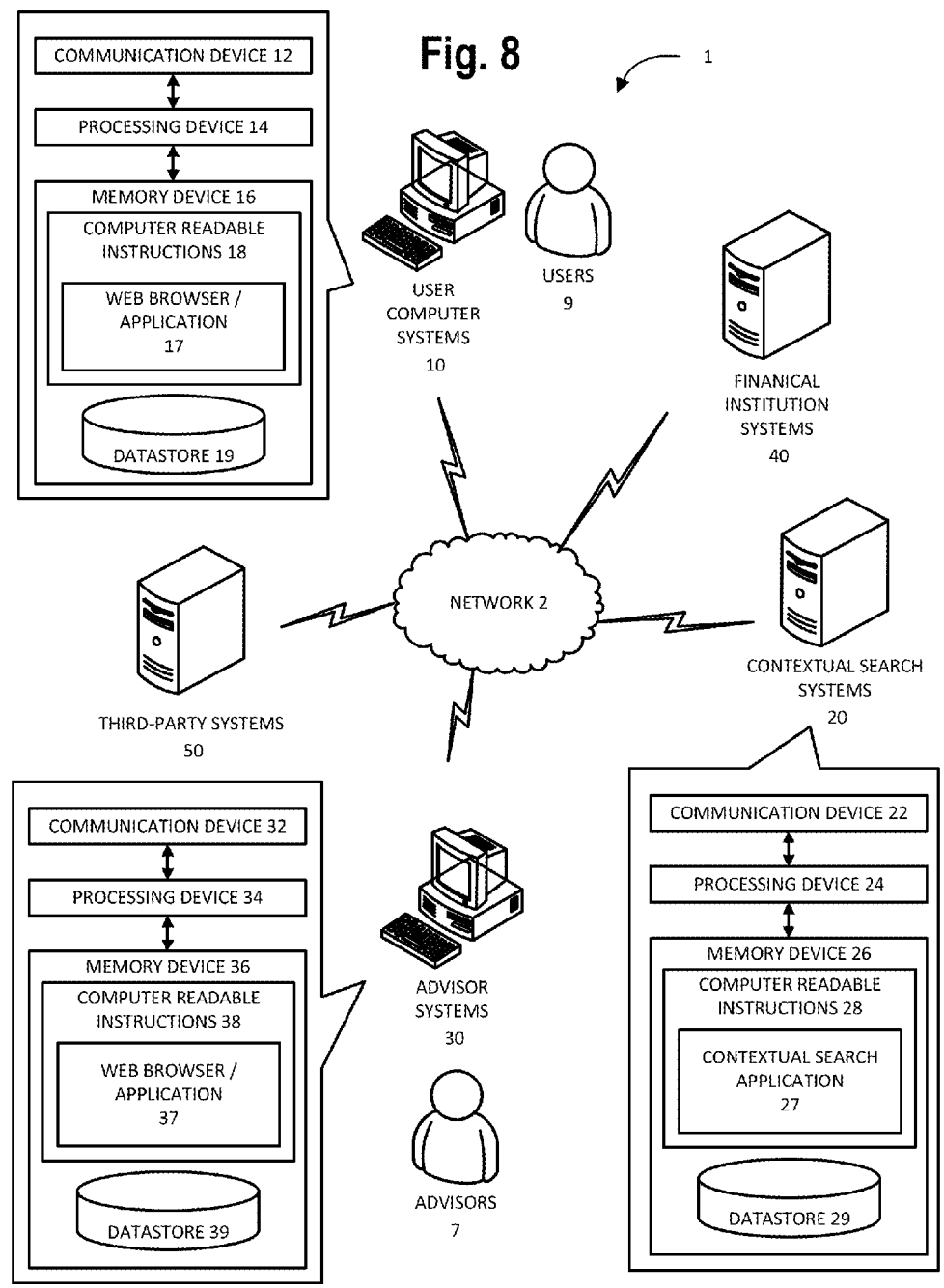

Having thus described embodiments of the invention in general terms, reference will now be made to the accompanying drawings, wherein:

FIG. 1 illustrates a high level process flow for a contextual search, in accordance with one embodiment of the present invention;

FIG. 2 illustrates a process flow for a contextual search, in accordance with one embodiment of the present invention;

FIG. 3 illustrates a contextual search interface, in accordance with one embodiment of the present invention;

FIG. 4 illustrates another contextual search, in accordance with one embodiment of the present invention;

FIG. 5 illustrates a process flow for a contextual search with advisor input, in accordance with one embodiment of the present invention;

FIG. 6 illustrates a contextual search interface, in accordance with one embodiment of the present invention;

FIG. 7 illustrates a contextual search interface with advisor input, in accordance with one embodiment of the present invention; and FIG. 8 illustrates a block system diagram for a contextual search tool environment, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution" or "bank," one of ordinary skill in the art will appreciate that other embodiments of the invention may involve other businesses or institutions that take the place of or work in conjunction with the financial institution or bank to perform one or more of the processes or steps described herein as being performed by a financial institution or bank. Still in other embodiments of the invention the financial institution or bank described herein may be replaced with other types of businesses or institutions that offer account services to users.

FIG. 1 illustrates a high-level process flow for a contextual search process 100. As illustrated by block 102 the contextual search process 100 comprises receiving a search from a user 9. The search may include search terms, keywords, phrases, filter selections, or the like The contextual search may be made through an internet browser, through an application, or the like that allows the user 9 to search for topics and provide additional information to tailor the search results to the user 9. In some embodiments, the search may be performed through a search account, such as an e-mail account, online banking account, social media account, application account, or the like for which profile information or account information of the user may be utilized to tailor the search results to the user 9.

Block 104 of the contextual search process 100 illustrates that the contextual search tool of the present invention determines search results for the user 9 based on the search received from the user 9. In addition to determining the search results, the contextual search system also determines dynamic contextual information to present to the user to tailor the search results to the user 9. The dynamic contextual information may include dynamic contextual questions, user profile information, user account information, or the like. The dynamic contextual information that is determined may be based on the search terms received from the user, the user profile information (e.g., if the user profile information has been previously stored), the user account information (e.g., savings amount, investing amount, checking amount, transaction information for products or services), and/or the like.

As illustrated by block 106 of FIG. 1, the contextual search tool of the present invention displays the search results, the content from the search results, and/or the dynamic contextual information to the user 9 in a contextual search interface. These may be presented in a single section or multiple sections.

Block 108 of FIG. 1, illustrates that the contextual search tool receives contextual input from the user 9 regarding the dynamic contextual information (e.g., answers to the dynamic contextual questions, selection or input of user profile information, selection of particular account information to use the in search, or the like), information that may be automatically used by the contextual search tool (e.g., based on stored user profile information, stored account information, stored dynamic contextual question answers, or the like), information related to the content selections made by the user (e.g., links, stories, blogs, articles, or the like selected by the user from the search results), and/or input provided by an advisor 7 (e.g., mortgage, financial, account, loan, savings, or any other type of advisor within or outside of the banking industry) with which the user 9 is communicating. As will be discussed in further detail later as the system of the present invention receives the various types of information it updates the search results and the contextual questions and presents the updated information in the contextual search interface.

The dynamic contextual information of the present invention improves the accuracy, speed, and efficiency of the contextual search tool. The dynamic contextual information is updated in real-time or near real-time based on any changes the user makes to any of the sections in the contextual interface, or any changes to the user's profile or account information as the changes occur. As such, the aspects of the contextual search tool described below improve upon the search results of a user by augmenting the original search results with customized dynamic contextual information of the user 7. Without the use of the dynamic contextual information of the present invention a user's search is limited to the search terms provided by the user 9, which may or may not provide the desired search results. By allowing for the use of dynamic contextual information the contextual search tool may request information that would help improve the user's search, but the information used in the search is still determined and controlled, in part by the user 9 in real-time. As such, the contextual search tool or module thereof is specialized to take the search terms of the user 9 and identify not only initial search results, but dynamic contextual information that the user 9 may view and respond to in real-time to improve upon the search results. Moreover, the search results may be presented to the user 9 in a way to efficiently allows the user 9 view the search results, scroll through the content associated with the search results, and augment and improve upon the search results through the dynamic contextual information in a single interface.

FIG. 2 illustrates a process flow for a contextual search process 200, in accordance with one embodiment of the present invention. As illustrated by block 202 in FIG. 2, and as previously discussed with respect to block 102 in FIG. 1, the contextual search tool of the present invention receives a search from a user 9. As previously discussed the search may include search terms, keywords, phrases, filter selections, or the like. The search may be received through a web browser, crawler, application, or the like that identifies search results using an algorithm based on the inputted search. In some embodiments, of the invention the user may log into an account into order to perform the search. By logging into an account, the contextual search tool may utilize additional information related to user profile information or user account information to improve upon the search results. In one embodiment of the invention the user account may be an account the user has with a financial institution, such as but not limited to an online banking account application. For example, the user 9 may log into the user's online banking account, which may have user profile information about the user 9 and/or user account information. The user profile information may include information about the user 9, such as the user's age, income, address, financial wellness, interests, or the like as will be discussed in further detail later. The user account information may include the amount of funds in user accounts (e.g., checking, savings, investment accounts, or the like), transactions made by the user using the accounts (e.g., purchases, products, services, bill payments, or the like), dates, times, or locations where the accounts were opened or used, products or services purchased with the accounts, merchants or other customers with which the user has entered into transactions (e.g., made purchases, transferred money, or the like), or the like. The financial institutions of the users 9 may be in a particular beneficial position through which to perform the search because the financial institution often has user profile information and user account information, which may be used to augment or filter the user's search. In other embodiments of the invention, the search may be performed through other types of accounts, such as e-mail accounts, social media accounts, dedicated search accounts, merchant accounts, or the like.

As illustrated by decision block 204, after receiving the search from the user 9, the contextual search tool may determine if there is any user profile information or user account information associated with the user 9. As illustrated by block 206 if there is user profile information or user account information, then the user profile information or user account information is utilized to augment the search terms received from the user or the search results determined based on the search received from the user 9. For example, as illustrated by the contextual interface 300 of FIG. 3, the user 9 may have utilized a search field 302 in the interface to search the phrase "housing." As described above, search results for this search may be determined by the contextual search tool, such as one or more articles, videos, audio, blogs, interface links, or other like content related to the search terms. Either before the search results are determined by the contextual search tool and/or after the search results are determined the search results may be augmented and/or filtered based on the user profile information or the user account information. For example, when the contextual search tool receives the search terms "housing" the contextual search system may identify the amount of funds the user 9 has in the user accounts, the financial worthiness of the user 9, the age of the user, the location of the user, or the like. For example, the contextual search tool may identify that the user 9 is located in city XYZ (e.g., based on the location of the account or the location of transactions), that the user is XX years old (e.g., included in the user profile information), that the user 9 has XX,XXX in a savings account that could be utilize for a down payment on a house (e.g., from user account information), and that the user 9 has excellent credit worthiness (e.g., from stored user profile information). Based on this additional information the contextual search tool may modify the search terms or filter the search results (e.g., augment the search for "housing" or filter the search results found for the term "housing" to identify content developed for young homebuyers, with good credit worthiness, for city XYZ, for users with a similar net worth for savings, or the like). Moreover, in some embodiments, the contextual search tool may fill out content with the user profile information or user account information (e.g., fill out a mortgage calculator with the credit worthiness and/or savings amount for a down payment) in order to provide more customized search results for the user 9.

As illustrated by block 208, either after the determination that there was no user profile information or account information (e.g., block 204) or after the search results have been augmented or filtered (e.g., block 206) the contextual search results are displayed in a contextual search interface 300 as illustrated in FIG. 3. In one embodiment of the invention the contextual search interface 300 may include a search results section 310, a content section 320, and a dynamic contextual information section 330. As illustrated in FIG. 3, the search results section 310 may be located on the left side of the contextual interface 300 and include a list of the search results, which may or may not be augmented by user information or user profile information. The search results may be listed in the order as the most relevant to the search requested by the user and/or as augmented or filtered by the user information or the user account information. The content section 320 may include the content, or portions thereof of one or more of the search results, which illustrates the actual articles, videos, audio, text, blogs, or other content related to the each of the search results in the search results section 310. As illustrated in the content section 320 the content may be displayed in the order in which the search results are displayed in the search results section 310. The user 9 may scroll through the content section 320 and/or the search results section 310 and the content for each of the search results will be displayed in the content section 320.

The dynamic contextual information section 330 may include dynamic contextual information that is presented and/or changed, as discussed in further detail later based on contextual information input (e.g., user answers one of dynamic contextual questions, adds or updates the user profile information, allows the user of account information, or the like) from the user 9 (or advisor 7 as discussed in further detail later). As previously discussed, the dynamic contextual information may include information for the user 9 that when answered, selected, or otherwise allowed for use in the search, would tailor the search results from the user's search to the user 9. For example, as illustrated by the profile section 332, the dynamic contextual information section 330 may include an area in which the strength of the user's profile may be displayed (e.g., 20% complete) indicating that there is additional user profile information that the user may submit in order to provide additional information about the user 9 that would improve the search results for the user 9 (e.g., the user's age, location, interests, net worth, or the like). The user 9 may select the profile section 332 in order to provide additional profile information through another screen, pop-up, or within the profile section 332 itself. In another example, the dynamic contextual information section 330 may include a financial worthiness question section 334 in which the user 9 may provide additional information related to the credit history of the user 9. The credit history may provide additional information that may narrow the search results of the user 9 (e.g., low financial worthiness history may provide articles related to how to improve financial worthiness, or good financial worthiness history may provide articles related to utilize available loans). In another example, the dynamic contextual information section 330 may include a household section 336, in which the user may provide information or answers to questions related to other members of the user's family or household, link the user's profile to profiles of other households (e.g., wife's profile), link the household accounts to the user's account, link the favorite advisors of the household users to the user 9 of the present invention, such that when the user 9 searches for content the user profile information or account information of other members of the household may be utilize to augment or filter the contextual search results of the user's search. In still another example, the user 9 may also utilize a location section 338 in the dynamic contextual information section 330 in order to set/change the user's locations (e.g., a default location, temporary location, future location, past location, or the like). The location information may be utilized to tailor the search results to the user 9. In other embodiments of the invention other dynamic contextual information may displayed in various sections within the dynamic contextual information section 330 of the contextual interface 300. For example, in some embodiments the dynamic contextual information section 330 may include specific questions regarding the amount of money the user 9 has to spend, the products or services in which the user 9 is interested, financial goals of the user 9, other income streams of the user 9, or the like. In still other embodiments of the invention the dynamic contextual questions may be related to some of the initial search results, for example, if the user search "housing" the dynamic contextual questions may include an indication if the user is interested in buying or selling, buying or renting, condos, luxury or moderate homes, or the like. It should be understood why the illustrated embodiment relates to housing, the search results, and thus the dynamic contextual questions may be related to any type of topic.

As illustrated by block 210 of FIG. 2, the contextual search tool receives contextual input based on the user's actions. For example, the contextual input may be direct input, such as but not limited to answers to the dynamic contextual questions, the addition of user profile information, the user allowing the use of account information, or the like. However, the contextual input may comprise indirect input such as the search results selected (e.g., the links or articles selected) by the user 9 in the search results section 310, the amount of time the user 9 spends on a particular search result (e.g., time reading an article), changes in the user's account information (e.g., transactions that are associated with the user's account as the user shops), or the like.

As illustrated by block 212 the contextual search tool updates the search results and the dynamic contextual information based on the contextual input received from the user. For example, as illustrated by the contextual search interface 400 in FIG. 4, the user 9 may have selected on the buy vs. renting article link from FIG. 3, selected that the user 9 has excellent financial worthiness in the dynamic contextual information section 334, and selected city XYZ as the user's location. In response, the contextual search system may display the selected article first in the content section 420, but may update the search results in the search results section 410 and the dynamitic contextual information in the dynamic contextual information section 430. For example, the search results section 410 may be updated with the more relevant tailored search results for the user 9 (e.g., an article about the real estate market in city XYZ, a mortgage calculator, articles for home buyers with excellent financial worthiness, or the like). In addition, the dynamic contextual information section 430 may be updated with additional dynamic contextual information that might provide additional information to further tailor the search results of the user 9. For example, in some embodiments the dynamic contextual information section 430 may ask the user 9 for input related to how much the user would like to spend on a monthly housing payment (e.g., mortgage payment, rent payment, or the like). The user's response to this question may further augment or filter the search results.

The dynamic contextual information sections 330 may also include contextual information that is for information purposes. For example, as illustrated information such as the average monthly rental price for specific types of housing may be displayed. In some embodiments, the user 9 may select on these information sections to further refine the search results. As such, by selecting on a particular type of information (e.g., average monthly rental payment for a 2 bedroom apartment) the contextual search system may infer that the user is interested in two bedroom apartments and further limit the scope of the contextual search results to content related to 2 bedroom apartments. In some embodiments, this type of information may appear in the search results section instead of the dynamic contextual results section.

Moreover, the dynamic contextual information section 430 may further include account information related to user, such that the user 9 has account information directly at hand when reviewing the search results. For example, the dynamic contextual information section 430 may include the user's current savings balance 442, checking balance, investment balance, or other like balances such that the user knows how much is available in the user's accounts for transactions while searching for content (e.g., for a down payment on a home). In some embodiments, of the invention, the user 9 may select the account information in order to allow the contextual search tool to utilize the account information to determine the search results. For example, the user 9 may allow the contextual search tool to identify that the user has $XX,XXX in savings, and thus use this information to provide information related to loans the user may receive based on the user's savings balance.

The examples provided herein with respect to FIGS. 3 and 4, are illustrated as being related specifically to home buying or renting; however, it should be understood that in other embodiments of the invention the search terms, the search results, content, and/or the dynamic contextual information section may include any type of search terms, search results, content, and/or dynamic contextual information for augmenting or filtering the search results of the user 9 for any type of content.

Decision block 214 in FIG. 2 further illustrates that a determination may be made whether or not the user clears or saves the contextual input for the search results. In some embodiments the contextual input, and specifically the answers to the dynamic contextual information, may or may not be saved for use in follow up searches performed by the user 9. As illustrated by block 216, in one embodiment of the invention the user 9 may request that the contextual input related to the dynamic contextual information is saved by the contextual search tool for use in other content searches. For example, the user may determine to save information to the user profile related to the financial worthiness, the user's location, the user's age, average monthly salary, or any other type of dynamic contextual questions, user profile information, or user account information. As such, this type of information may utilize whenever the user 9 performs additional content searches. The user 9 may be able to amend, change, add, or delete saved information as the user 9 desires by editing the dynamic contextual questions, the user profile information, or change access to the user of user account information. As illustrated by block 218 in FIG. 2, the user 9 may clear one or more of the dynamic contextual information, such that the contextual input for a current search made by the user 9 is not carried over to future searches.

Block 220 of FIG. 2 illustrates that the contextual search tool will continue to update the search results, the content, and the dynamic contextual information (e.g., including the dynamic contextual questions, or the like) based on any changes to the search terms, answers to the dynamic contextual questions, updated profile information, account information, the links that the user selects, the time the user spends on viewing specific content, household information, or any other information that may be displayed in the dynamical contextual information section 430.

FIG. 5 illustrates a process flow for a contextual search based on advisor input, in accordance with one embodiment of the present invention. Blocks 502 through 506 illustrate that a user 9 performs a search, a contextual search tool determines search results based on the search and/or dynamic contextual information, and the contextual search system displays the search results and dynamic contextual information to the user in a contextual search interface, as previously discussed with respect to blocks 102 to 108 in FIG. 1 and blocks 202 to 212 in FIG. 2.

Block 508 in FIG. 5 illustrates that the contextual search system receives an indication that the user 9 may like to speak to a representative (e.g., mortgage advisor, financial advisor, account advisor, investment advisor, or other like banking advisor within the financial institution, or another advisor outside of the financial institution). The indication may be based on a one or more factors, including but not limited to a determination that the user 9 is looking at content related to opening an mortgage, opening an investment account, seeking investment advice, the search terms of the user 9, or any other indication that user would like to speak to an advisor related to a business, such as a customer service advisor, a sales advisor, whether or not the advisor is or is not in the financial industry. For example, as illustrated in the contextual interface 600 in FIG. 6 the user may be searching for investments for beginners as illustrated by the search terms in the search field 602 illustrated the contextual interface 600 of FIG. 6. Like the other contextual interfaces previously described, the contextual interface 600 may include a search results section 610, a content section 620, and a dynamic contextual information section 630. As previously discussed with respect to the other contextual interfaces the search results section 610 may include articles, links, or other search results based on the search terms. Content related to one or more of the search results may be presented in the content section (e.g., an article related to new investors and an investment calculator). Moreover, dynamic contextual information may be presented to the user 9 in the dynamic contextual information section 630, such as profile questions 632, financial goals questions 634, income questions 636, household questions 638, and other questions 640. In another example, the user 9 may select on the search results related to opening an account in the search results section 610, which may provide an indication that the user 9 may want to speak to a user 9.

Once a determination is made that a user may want to speak with an advisor a determination is made as to what type of advisor the user 9 may want to speak to, as illustrated by block 510 in FIG. 5. For example, if the user is searching home buying or rental properties, the contextual search tool may identify that the user 9 wishes to speak to a mortgage advisor 7. As illustrated in another example in FIG. 6, the user 9 is searching for investment content for beginning investors, and as such, the contextual search tool may determine that the user 9 wishes to speak to an investment advisor 7. It should be understood that the present invention may be utilized for any type of business, and as such, any type of advisor may be determined that is within or outside of the business (e.g., marketing advisors, purchasing advisors, interior designer advisors, or the like) depending on what the user 9 is searching for and what institution has access to the user's search. Moreover, when the type of advisor 7 is identified an indication (e.g., notification, or the like) is presented to the user 9 in order to allow the user 9 to request to communicate with an advisor 7, as illustrated by block 510 in FIG. 5. As illustrated in FIG. 7, in one embodiment, after the user 9 selects the open an account search result link (e.g., in the search results section 610, 710, or otherwise provides another indication, the content section 620, 720 may change to display open account content, and the dynamic contextual information section 630, 730 may change to provide a suggestion to speak to an investment advisor 7 as illustrated in the advisor suggestion section 740 of the dynamic contextual information section 630. In other embodiments of the invention the suggestion to speak to an advisor 7 may be displayed in other locations, such as but not limited to a pop-up window, the content section 620, the search results section 610, another section within the interface or outside of the interface in another interface in another window.

As illustrated by block 512 the contextual search tool may receive an indication from the user 9 that the user 9 would like to communicate with an advisor 7. As illustrated in the contextual search interface 700, the user 7 may request to talk with an advisor now 742 or to schedule an appointment 744 with an advisor 7 in the future. Regardless of what option is selected in some embodiments of the invention the contextual search tool may identify potential advisors 7 based the location of the user 7, the advisors 7 the user 9 or the user's household has utilized in the past, the advisors 7 that are marked as a favorite by the user 9 or the user's household, or another method of determining the advisor to present to the user 9.

Either after the user 9 makes the request to speak to the advisor 7, or at a later point in time, the contextual search tool, or another system, may initiate a communication between the user 9 and the advisor 7. In some embodiments the communication may occur over a video conference, teleconference, chat, e-mail, instant message, or other like communication channel.

As illustrated by block 516 the contextual search tool may provide the advisor 7 with access to the user's contextual search (e.g., share the user interface with the advisor 7, provide the advisor with information related to the user's search, such as but not limited to the search terms, the search results, the dynamic contextual questions, the user information, the user account information, or the like). Accordingly, the advisor 7 is able to identify what the user 9 is searching for. Moreover, the advisor 7 is allowed to access the user's search in order to make changes to the user's search. For example, the user's interface (or a similar interface) may be presented to the advisor 7 on the advisors computer system. The advisor 7 may be able to drag and drop, upload, or otherwise provide information directly onto the user's interface. The user 9 may be able to see what the advisor 7 is doing in real-time or near real-time, but in other embodiments, the advisor 7 may actively make a selection to update the user's interface before the user 9 is able to view the search results, dynamic contextual information, or content to the user's screen.

Block 518 in FIG. 5 illustrates that the contextual search tool receives advisor input related to the user search. The advisor input may occur directly through the contextual search interfaces, or may occur on the back end of the system that may not be visual to the user 9. As such, the advisor 7 is able to change, for example augment, add, delete, modify, activate, deactivate, or the like the user's search terms, the search results in the search results sections, the dynamic contextual information (e.g., the contextual questions, user profile information, the account information, or the like), and/or the content in the content section. The advisor 7 may only make the changes to the search terms, the search results, the dynamic contextual information, and/or the content if user 9 agrees to allow the advisor 7 to make the changes.

As such in one embodiment of the invention, the advisor 7 may change the search terms of the user by adding or deleting keywords or phrases from the search fields. Since the advisor is an expert or specialist in the area in which the user 9 is interested (e.g., in the area in which the user 9 is searching) the advisor 7 may be in the best position to help the user 9 tailor the search terms to achieve the desired search results.

Moreover, the advisor 7 may add content to the search results (e.g., in the search results section or directly to the content section). For example, the advisor 7 may know of an article, video, audio file, or other type of content that might interest the user 9, however, the content may not be available using a search of the Internet or Intranet, or may be hard to find. As such, the advisor 7 may be able to provide the content directly to the user 9. In some embodiments, the content may be linked or otherwise saved with the search performed by the user 9, such that if the user 9 uses the same or similar search again, the content provided by the advisor 7 will be included in the search results.

The advisor 7 may also provide, edit, or answer the dynamic contextual information. For example, during the conversation with the user 9 the advisor 7 may be able to identify information about the user 9, such as but not limited to user profile information, user account information, and/or the dynamic contextual questions that can be utilized to improve the search results requested by the user 9. As such, the advisor 7 may update or add user profile information to improve the search results. For example, the advisor 7 may update the user's age, income, address, financial wellness, interests, or the like to provide improved search results. The advisor 7 may also allow account information to be utilized to improve the search results. With the approval of the user 9, the advisor 7 may allow the contextual search tool to utilize the user's account information to tailor the search results to the user 9. For example, if the user 9 has a trading account in which the user 9 is allowed trade on margin or is otherwise recognized as an experienced trader because the user 9 has made a specific number of trades, has a balance above a specified level, has a particular amount of return over a time period, or the like, content related to more experienced traders may be presented to the user 9 (and less experienced investors may receive content related to new investors). Moreover, in other embodiments the advisor 7 may be able to add specific dynamic contextual questions to the dynamic contextual search section 730 that the advisor 7 thinks will improve the search results of the user 9, and the user 9 may decide whether or not to answer the dynamic contextual questions to improve the search results.

As such, the advisor 7 in the present invention may provide the contextual search tool additional input that the user 9 may not know how to use in a search, that the user 9 did not think about using in a search, or that the user 9 did not have access to in order to include in a search. The additional information added by the advisor 7 is added in real-time or near real-time as the user 9 is searching for results and/or is communicating with the advisor 7. The addition of the real-time or near real-time input from the advisor 7 improves the speed, accuracy, and efficiency at which the user 9 may identify information in the search results that actually covers what the user 9 is looking for.

Any of the information provided by the advisor 7, such as the search results, content, and the dynamic contextual questions may be saved to the specific search and/or to the user's profile or account information, or otherwise may be linked with the user 9, such that the saved information may be presented to the user 9 or used in the user's future search results to provide more tailored search results to the user 9. Specifically, with respect to the dynamic contextual information (e.g., dynamic contextual questions, the user profile information, or the user account information) the advisor may be able to save an association of this information with the user 9. The user 9 may be able to decide whether or not the advisor 7 has the ability to provide and/or save an association of the search results, content, or dynamic contextual information with the user 9 for future searches.

Blocks 522 to 528 are the same as previously discussed with respect to blocks 214 to 220 in FIG. 2. As such, the user 9 may or may not decide to save the dynamic contextual information added by the advisor 7 for future searches. Moreover, as illustrated by block 528 the search results, content, and/or the dynamic contextual information are updated as the user 9 or the advisor 7 update the dynamic contextual information or the search terms, take other actions as previously discussed with respect to the search results and/or the content associated with the search results.

In other embodiments of the invention, the user 9 may only allow the advisor 7 to see specific information with respect to the user 9 and/or the user's search. For example, the user 9 may want not want to present information related to the user's family (e.g., has three kids), the user's profile (e.g., interests of the user 9), the user's account information (e.g., savings and investments with other banks), or dynamic contextual information (e.g., locations where the user 9 is looking to live) to the advisor 7, but the user 9 may want to include this information in the contextual search. As such, in some embodiments of the invention the user 9 may be able to allow this information to be included in the search results (e.g., the algorithm or the software may use the information), but prevent the advisor 7 from seeing the information. The user 9 may still use the advisor 7 to continue to provide input to the contextual search results while shielding the advisor 7 from sensitive information that the user 9 does not what the advisor 7 to have access to.

In other embodiments of the invention, the user's search results, content, and dynamic contextual information may be time stamped, saved, and stored such that the user 7 and/or the advisor 9 may revisit the searches in the future. In one embodiment, the search may be dumped into an interface which the user 9 can access to see what was used within a specific search. For example, the keywords used, the search results, the content, and the dynamic contextual search information used during the user search may be saved and accessed at a later point in time. The user 9 may request to save specific searches or the contextual search tool may automatically save the user's searches. The user 9 may return to the searches in the future in order to re-run the searches with specific dynamic contextual search information turned on or turned off, or with the addition of new contextual search information that has changed. For example, the user 9 may rerun an old search, but include additional account information related to additional funds that the user may have, while turning off information related to the number of kids the user may have, or the like. In other embodiments of the invention the user 9 may access the saved search in order to pick additional information to add to a current search, such as drag and dropping old search terms, search results, content, and dynamic contextual information into a new search to improve the search results of the user's current search.

FIG. 8 illustrates a contextual search tool environment 1, in accordance with an embodiment of the present invention. As illustrated in FIG. 8, the user computer systems 10 are operatively coupled, via a network 2 to the contextual search systems 20, the advisor systems 30, other financial institution systems 40, or third party systems 50. As discussed herein, in this way, the user computer systems 10 may be utilized by users 9 in order to utilize a contextual search tool to receive more relevant search results based on input for dynamic contextual information, selections of the search results, review of content identified during the search, or the like. FIG. 8 illustrates only one example of embodiments of a contextual search tool system environment 1, and it will be appreciated that in other embodiments one or more of the systems (e.g., computers, mobile devices, servers, or other like systems) may be combined into a single system or be made up of multiple systems.

The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network 2.

As illustrated in FIG. 8, the user computer systems 10 generally comprise a communication device 12, a processing device 14, and a memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12 and the memory device 16. The processing device 14 uses the communication device 12 to communicate with the network 2 and other devices on the network 2, such as, but not limited to, the contextual search systems 20, the advisor systems 30, and other financial institution systems 40, or third-party systems 50. As such, the communication device 12 generally comprises a modem, server, or other device for communicating with other devices on the network 2, and a display, camera, keypad, mouse, keyboard, microphone, and/or speakers for communicating with one or more users 9. The user computer systems 10 may include, for example, a personal computer, a laptop, a mobile device (e.g., phone, smartphone, tablet, or personal display device ("PDA"), or the like) or other devices, or the like.

As further illustrated in FIG. 8, the user computer systems 10 comprises computer-readable instructions 18 stored in the memory device 16, which in one embodiment includes the computer-readable instructions 18 of a web browser or application 17. In some embodiments, the memory device 16 includes a datastore 19 for storing data related to the user computer systems 10, including but not limited to data created and/or used by the web browser or application 17. As discussed above the web browser or application 17 allows the users 9 to communicate with the contextual search application 27 (e.g., the contextual search tool, or the like), the advisor application 37, or other applications provided by the financial institution or third-party in order to send and receive information for the contextual search and contextual search results. In some embodiments a web browser is used to access websites, applications, or the like; however, in other embodiments a specific application (e.g., mobile application, computer application, or the like) is specifically configured to communicate with the other systems and applications within the contextual search tool environment 1. In still other embodiments of the invention portions of other applications may be stored on the user computer systems 10, such as but not limited to the contextual search application 27, the advisor application 37, or other applications.

As further illustrated in FIG. 8, the contextual search systems 20 generally comprise a communication device 22, a processing device 24, and a memory device 26. The processing device 24 is operatively coupled to the communication device 22 and the memory device 26. The processing device 24 uses the communication device 22 to communicate with the network 2, and other devices on the network 2, such as, but not limited to, the user computer systems 10, advisor systems 30, other financial institution systems 40, or third-party systems 50. As such, the communication device 22 generally comprises a modem, server, or other device(s) for communicating with other devices on the network 2.

As illustrated in FIG. 8, the contextual search systems 20 comprise computer-readable program instructions 28 stored in the memory device 26, which in one embodiment includes the computer-readable instructions 28 of a contextual search application 27. In some embodiments, the memory device 26 includes a datastore 29 for storing data related to the contextual search systems 20, including but not limited to data created and/or used by the contextual search application 27. The contextual search application 27 (e.g., the contextual search tool, or the like), as discussed above, receives the search from the user 9, determines search results and dynamic contextual information to present to the user 9 in order to receive user input for the dynamic contextual information (or other user input) to improve upon the search results. In addition, to receiving input from the users 9, search terms and dynamic contextual information may be received from advisors 7. The search results, updated search results, content, updated content, dynamic contextual information, and/or updated dynamic contextual information may be displayed to users 9 through the contextual search application 27 on the user's web browser or application 17 on the user computer systems 10 (e.g., laptops, mobile devices such as smartphones or tablets, or the like) or on any other type of system utilized by the users 9 (e.g., ATMs, kiosks, terminals, or the like).

As further illustrated in FIG. 8, the advisor systems 30 generally comprise a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the user computer systems 10, the contextual search systems 20, the other financial institution systems 40, and or the third-party systems 50. As such, the communication device 32 generally comprises a modem, server, or other devices for communicating with other devices on the network 2.

As illustrated in FIG. 8, the advisor systems 30 comprise computer-readable program instructions 38 stored in the memory device 36, which in one embodiment includes the computer-readable instructions 38 of an advisor application 37. In some embodiments, the memory device 36 includes a datastore 39 for storing data related to the advisor systems 30, including but not limited to data created and/or used by the advisor application 37. The advisor application 37 allows the user 9, in one embodiment, to communicate with the advisor 7 and allows the advisor 7 to provide information to the contextual search to improve the search results of the user 9.

The other financial institution systems 40 are operatively coupled to the user computer systems 10, contextual search systems 20, advisor systems 30, or third-party systems 50, through the network 2. The other financial institution systems 40 have devices the same as or similar to the devices described for the user computer systems 10, contextual search systems 20, and advisor systems 30 (e.g., communication device, processing device, memory device with computer-readable instructions, datastore, or the like). Thus, the other financial institution systems 40 communicate with the user computer systems 10, contextual search systems 20, advisor systems 30, or third-party systems 50 in the same or similar way as previously described with respect to the user computer systems 10, contextual search systems 20, and/or the advisor systems 30. The other financial institution systems 40, in some embodiments, provide profile information or account information as described above, which may be used to improve the contextual search results.

The third-party systems 50 are operatively coupled to the user computer systems 10, contextual search systems 20, advisor systems 30, or other financial institution systems 40 through the network 2. The third-party systems 50 have devices the same as or similar to the devices described for the user computer systems 10, contextual search systems 20, advisor systems 30, and/or other financial institution systems 40 (e.g., communication device, processing device, memory device with computer-readable instructions, datastore, or the like). Thus, the third-party systems 50 communicate with the user computer systems 10, contextual search systems 20, advisor systems 30, and/or other financial institution systems 40 in the same or similar way as previously described with respect to each system. The third-party systems 50, in some embodiments, are comprised of systems of content providers, third-party financial institutions, financial service providers, software services, merchants, or the like that store and provide content information, profile information, account information, or the like for the contextual search. The contextual search tool is utilized to access these third-party systems based on the user search and the dynamic contextual information and provide the search results and associated content to the user 9.

It is understood that the systems and devices described herein illustrate one embodiment of the invention. It is further understood that one or more of the systems, devices, or the like can be combined or separated in other embodiments and still function in the same or similar way as the embodiments described herein.

The invention has been described herein as being implemented by a contextual search tool; however, it should be understood that in other embodiments of the invention other tools or applications, or systems or processors running the tools or applications may perform one or more of the steps of the present invention.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks'.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for providing a contextual search tool that improves search results presented to a user, the system comprising:
one or more memory devices; and
one or more processing devices operatively coupled to the one or more memory devices, wherein the one or more processing devices are configured to execute computer-readable program code to:
receive a search from the user, wherein the search is received through a user computer system;
accessing user profile information from a user profile;
accessing user account information, wherein the user account information is access by accessing one or more financial accounts of the user;
determine the search results to display in a contextual search interface based on the search received from the user, the user profile information, and the user account information from the one or more financial accounts of the user, wherein the contextual search interface is provided on the user computer system;
display the search results in a search results section of the contextual search interface, wherein the search results comprise a list of the search results;
display content in a content section of the contextual search interface, wherein the content is for at least one of the search results from the search results section, wherein the content in the content section of the contextual search interface changes when the user selects different search results from the search results section, and wherein the content section and the search results section are different sections;
determine a user profile strength of the user profile based on the user profile information;
determine dynamic contextual information based on the search from the user, wherein the dynamic contextual information comprises dynamic contextual questions related to each of the user profile information, the user account information, and the search from the user;
display the dynamic contextual information and the user profile strength in a dynamic contextual information section of the contextual search interface, wherein the dynamic contextual information section is different from the search results section and the content section;
receive contextual information input from the user, wherein the contextual information input comprises at least an answer to the dynamic contextual questions in the dynamic contextual information section of the contextual search interface relating to the user profile information, the user account information, and the search from the user, and wherein the contextual information input is received through the user computer system;

receive a selection of at least one of the search results selected by the user, wherein the selection of the at least one of the search results comprises a selection of a search result from the search results section, and wherein the selection of at least one of the search results is receive through the user computer system;

determine updated search results, updated content, and updated dynamic contextual information and updated user profile strength based on the contextual information input from the user and the selection of the at least one of the search results, wherein the updated dynamic contextual information comprises at least one updated dynamic contextual question; and display the updated search results in the search results section, the updated content in the content section, and the updated dynamic contextual information and the updated user profile strength in the dynamic contextual information section.

2. The system of claim 1, wherein the one or more processing device are further configured to execute computer-readable program code to:

present a user login interface to the user, wherein the user login interface is presented on the user computer system;

receive a user login through the user login interface;
authenticate the user;

wherein the search results and the updated search results are based at least in part on the authentication of the user by determining the user profile information and the user account information associated with the authentication of the user.

3. The system of claim 1, wherein the one or more processing devices are is further configured to execute computer-readable program code to:

provide a request to the user to save the contextual information input to the user profile; and receive a request from the user to save the contextual information input to the user profile, wherein the contextual information input is utilized in the future for determining the updated search results or other search results.

4. The system of claim 1, wherein the dynamic contextual information comprises a location associated with the search, and wherein the user can change the location associated with the search to find a new location for the updated search.

5. The system of claim 1, wherein the one or more processing devices are further configured to execute computer-readable program code to:

determine an amount of time the user views the content for the at least one of the search results; and determine the updated search results and the updated dynamic contextual information based on the amount of time the user views the content for the at least one of the search results.

6. A computer program product for providing a contextual search tool that improves search results presented to a user, the computer program product comprising at least one non-transitory computer-readable medium having computer-readable program code portions embodied therein, the computer-readable program code portions comprising:

an executable portion configured for receiving a search from the user, wherein the search is received through a user computer system;

an executable portion configured for accessing user profile information from a user profile;

an executable portion configured for accessing user account information, wherein the user account information is access by accessing one or more financial accounts of the user;

an executable portion configured for determining the search results to display in a contextual search interface based on the search received from the user, the user profile information, and the user account information from the one or more financial accounts of the user, wherein the contextual search interface is provided on the user computer system;

an executable portion configured for displaying the search results in a search results section of the contextual search interface, wherein the search results comprise a list of the search results;

an executable portion configured for displaying content in a content section of the contextual search interface, wherein the content is for at least one of the search results from the search results section, wherein the content in the content section of the contextual search interface changes when the user selects different search results from the search results section, and wherein the content section and the search results section are different sections;

an executable portion configured for determining a user profile strength of the user profile based on the user profile information;

an executable portion configured for determining dynamic contextual information based on the search from the user, wherein the dynamic contextual information comprises dynamic contextual questions related to each of the user profile information, the user account information, and the search from the user;

an executable portion configured for displaying the dynamic contextual information and the user profile strength in a dynamic contextual information section of the contextual search interface, wherein the dynamic contextual information section is different from the search results section and the content section;

an executable portion configured for receiving contextual information input from the user, wherein the contextual information input comprises at least an answer to the dynamic contextual question in the dynamic contextual information section of the contextual search interface relating to the user profile information, the user account information, and the search from the user, and wherein the contextual information input is received through the user computer system;

an executable portion configured for receiving a selection of at least one of the search results from the user, wherein the selection of the at least one of the search results comprises a selection of a search result from the search results section, and wherein the selection of at least one of the search results is receive through the user computer system;

an executable portion configured for determining updated search results, updated content, and updated dynamic contextual information and updated user profile strength based on the contextual information input from the user and the selection of the at least one of the search results, wherein the updated dynamic contextual information comprises at least one updated dynamic contextual question; and an executable portion configured for displaying the updated search results in the search results section, the updated content in the content section, and the updated dynamic contextual information and the updated user profile strength in the dynamic contextual information section.

7. The computer program product of claim 6, wherein the computer readable program portions further comprise:
an executable portion configured for presenting a user login interface to the user, wherein the user login interface is presented on the user computer system;
an executable portion configured for receiving a user login through the user login interface;
an executable portion configured for authenticating the user; and
wherein the search results and the updated search results are based at least in part on the authentication of the user by determining the user profile information and the user account information associated with the authentication of the user.

8. The computer program product of claim 6, wherein the computer-readable program code portions further comprise:
an executable portion configured for providing a request to the user to save the contextual information input to the user profile; and
an executable portion configured for receiving a request from the user to save the contextual information input to the user profile, wherein the contextual information input is utilized in the future for determining the updated search results or other search results.

9. The computer program product of claim 6, wherein the dynamic contextual information comprises a location associated with the search, and wherein the user can change the location associated with the search to a new location for the updated search, and wherein the updated search results are further based on the new location.

10. The computer program product of claim 6, wherein the computer-readable program code portions further comprise:
an executable portion configured for determining an amount of time the user views the content for the at least one of the search results; and
an executable portion configured for determining the updated search results and the updated dynamic contextual information based on the amount of time the user views the content for the at least one of the search results.

11. A method for providing a contextual search tool that improves search results presented to a user, the method comprising:
receiving, by one or more processing devices, a search from the user, wherein the search is received through a user computer system;
accessing, by the one or more processing devices, user profile information from a user profile;
accessing, by the one or more processing devices, user account information, wherein the user account information is access by accessing one or more financial accounts of the user;
determining, by the one or more processing devices, the search results to display in a contextual search interface based on the search received from the user, the user profile information, and the user account information from the one or more financial accounts of the user, wherein the contextual search interface is provided on the user computer system;
displaying, by the one or more processing devices, the search results in a search results section of the contextual search interface, wherein the search results comprise a list of the search results;
displaying, by the one or more processing devices, content in a content section of the contextual search interface, wherein the content is for at least one of the search results from the search results section, wherein the content in the content section of the contextual search interface changes when the user selects different search results from the search results section, and wherein the content section and the search results section are different sections;
determining, by the one or more processing devices, a user profile strength of the user profile based on the user profile information;
determining, by the one or more processing devices, dynamic contextual information based on the search from the user, wherein the dynamic contextual information comprises dynamic contextual questions related to each of the user profile information, the user account information, and the search from the user;
displaying, by the one or more processing devices, the dynamic contextual information and the user profile strength in a dynamic contextual information section of the contextual search interface, wherein the dynamic contextual information section is different from the search results section and the content section;
receiving, by the one or more processing devices, contextual information input from the user, wherein the contextual information input comprises at least an answer to the dynamic contextual question in the dynamic contextual information section of the contextual search interface relating to the user profile information, the user account information, and the search from the user, and wherein the contextual information input is received through the user computer system;
receiving, by the one or more processing devices, a selection of at least one of the search results from the user, wherein the selection of the at least one of the search results comprises a selection of a search result from the search results section, and wherein the selection of at least one of the search results is receive through the user computer system;
determining, by the one or more processing devices, updated search results, updated content, and updated dynamic contextual information and updated user profile strength based on the contextual information input from the user and the selection of the at least one of the search results, wherein the updated dynamic contextual information comprises at least one updated dynamic contextual question; and
displaying, by the one or more processing devices, the updated search results in the search results section, the updated content in the content section, and the updated dynamic contextual information and the updated user profile strength in the dynamic contextual information section.

12. The method of claim 11, further comprising:
presenting, by the one or more processing devices, a user login interface to the user, wherein the user login interface is presented on the user computer system;
receiving, by the one or more processing devices, a user login through the user login interface;
authenticating, by the one or more processing devices, the user; and
wherein the search results and the updated search results are based at least in part on the authentication of the user by determining the user profile information and the user account information associated with the authentication of the user.

13. The method of claim 11, further comprising:
providing, by the one or more processing devices, a request to the user to save the contextual information input to the user profile; and
receiving, by the one or more processing devices, a request from the user to save the contextual information input to the user profile, wherein the contextual information input is utilized in the future for determining the updated search results or other search results.

14. The method of claim 11, wherein the dynamic contextual information comprises a location associated with the search, and wherein the user can change the location associated with the search to find a new location for the updated search.

15. The method of claim 11, further comprising:
determining, by the one or more processing devices, an amount of time the user views the content for the at least one of the search results; and
determining, by the one or more processing devices, the updated search results and the updated dynamic contextual information based on the amount of time the user views the content for the at least one of the search results.

* * * * *